Dec. 13, 1949     W. EARL     2,491,364
UNIVERSAL COUPLING
Filed Feb. 7, 1946
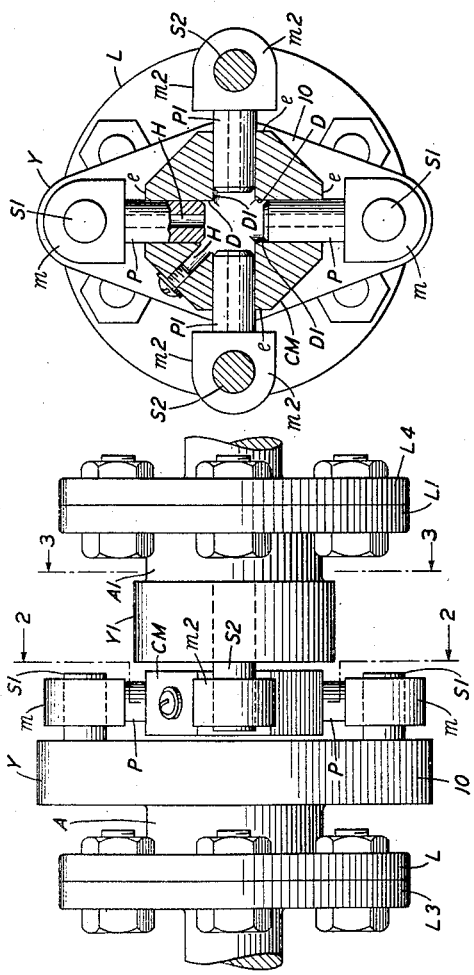
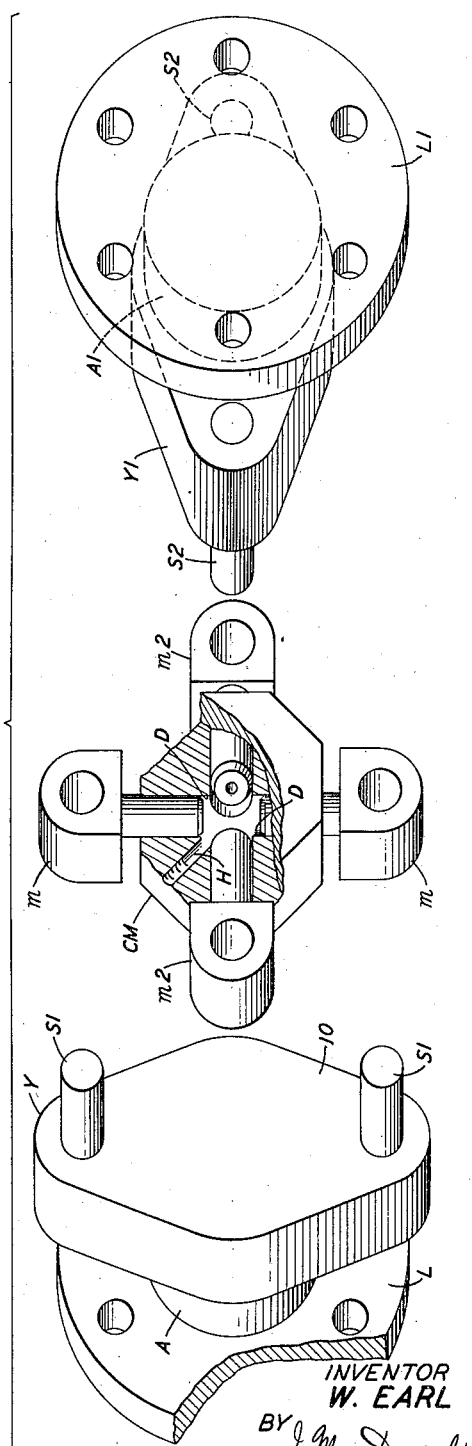
INVENTOR
W. EARL
BY J. MacDonald
ATTORNEY Patented Dec. 13, 1949

2,491,364

UNITED STATES PATENT OFFICE 2,491,364

UNIVERSAL COUPLING

William Earl, Boonton, N. J., assignor to Bell Telephone Laboratories, Incorporated, New York, N. Y., a corporation of New York Application February 7, 1946, Serial No. 646,111

5 Claims. (Cl. 64—17)

1

This invention relates to shaft couplings and more particularly to so-called universal couplings of the type used for operatively connecting two shafts disposed at an angle and out of coaxial relation to each other.

The object of this invention is the provision of a coupling of the type above referred to, which will be simple, cheap to manufacture, and by which the adjacent ends of two shafts disposed eccentrically and at an angle relative to each other are operatively connected in a positive and efficient manner.

In the drawing:

Fig. 1 is an assembly view;

Fig. 2 is a vertical sectional view, taken on line 2—2 of Fig. 1;

Fig. 3 is a vertical sectional view taken on line 3—3 of Fig. 1; and

Fig. 4 is an exploded view shown with a number of operating parts partly in section.

In the shaft coupling of this invention two similarly shaped yoke members Y and Y1 are each provided with a pair of studs S1—S1 and S2—S2 serving for receiving the head portions of similarly shaped plunger members $m$—$m$ and $m2$—$m2$, respectively, while the cylindrical portion P—P and P1—P1 of plunger members $m$—$m$, $m2$—$m2$ are fitted for pivotal movement into correspondingly sized radially disposed holes D—D and D1—D1 drilled substantially 90 degrees apart into a connecting member CM of octagonal cross-section shown in Figs. 1, 2 and 4.

The yoke members Y and Y1 are each formed with a cylindrical portion A and A1 and a flange portion L and L1, respectively. The flange L, for example, serves for connecting the yoke Y with the flange portion L3 of the armature shaft of a motor not shown and the flange L1 for connecting with a flange L4 carried by the driven shaft of an apparatus securely mounted on a base not shown common to that of the motor.

A connector member CM is provided with a drilled hole H, so as to form a container for a lubricant leading at the intersection of plunger holes D—D and D1—D1, the plungers being provided with holes as shown in Fig. 2, disposed longitudinally thereof leading to the studs S1—S1 and S2—S2 for lubricating them due to the centrifugal force acting on the lubricant while the coupling is in operation.

By the use of the coupling of this invention a driving and a driven shaft, which are disposed out of coaxial relation and forming an angle relative to each other, may be operatively connected by securing the flange portions L and L1 of the

2 yoke Y and Y1 to the flanges L3 and L4 of the driving and the driven shaft as shown in Fig. 1.

Under that condition, supposing that the space relation between the flanges L3 and L4 of the driving and driven shaft varies within a certain plus and minus distance limit, this distance adjustment is effected by the longitudinal position of plunger member $m$—$m$ and $m2$—$m2$ on the studs S1—S1 and S2—S2, while the non-coaxial adjustment or eccentricity of the driving shaft relative to the driven shaft is effected by the sliding movement of the cylindrical portion of the plunger members P—P and P1—P1 into their respective holes in the connector member CM within the limit defined by the space between the heads $m$—$m$ and $m1$—$m1$ of plunger members P—P and P1—P1 and the sides $e$ of the connector CM, the adjustment of the coupling to angular position of the two shafts being effected during the rotation of the shafts by the pivotal movement of the cylindrical portions of plunger members P—P and P1—P1 into the drilled holes in connector CM.

What is claimed is:

1. In a shaft coupling, a pair of yoke-shaped elements, a pair of studs carried by each of said elements, plunger members having means pivotally engaging said studs and a connector member having means disposed at right angles to each other engaged by said plunger members.

2. In a coupling for operatively connecting two shafts out of coaxial alignment and in angular relation to each other, said coupling comprising a pair of elements secured to the adjacent ends of the shafts, a pair of studs carried by each of said elements, plunger members having means pivotally engaging said studs, and means operatively engaging said plungers for movement longitudinally thereof for adjustment relative to said elements and operatively connecting said shafts.

3. In a coupling for operatively connecting the adjacent ends of a driving shaft and a driven shaft, a pair of elements having means connecting with the shafts, a pair of studs carried by each of said elements, plunger members having means engaging said studs for selfadjustment longitudinally thereof as determined by the space relation between the adjacent ends of the driving shaft and the driven shaft, and a connector element having means engaged by said plunger members in position at right angles to each other.

4. In a coupling for operatively connecting a driving shaft and a driven shaft, said coupling comprising a pair of yoke-shaped elements, a pair of studs carried by each of said elements extending perpendicularly therefrom, plunger members mounted on said studs for pivotal and self-adjustment longitudinally thereon, a connector member having means engaged by each of said plunger members in angular relation to each other, whereby said elements are permitted to move in adjustment relative to the angular and eccentricity relation of the driving and driven shaft.

5. In a coupling for operatively connecting a driving shaft and a driven shaft, said coupling comprising a pair of yoke members each having means for rigid connection with its respective shaft, a pair of studs extending perpendicularly from each of said yokes, plunger members pivotally mounted on said studs and capable of self-adjustment longitudinally thereon, a connector element having means disposed 90 degrees apart engaged by said plunger members and locating said yoke-shaped members at right angles to each other for permitting the selfadjustment of said yoke members relative to each other according to the angle and axial relation of the driving and the driven shaft.

WILLIAM EARL.

REFERENCES CITED

The following references are of record in the file of this patent:

UNITED STATES PATENTS

| Number | Name | Date |
|---|---|---|
| 1,178,529 | Loomis | Apr. 11, 1916 |
| 1,411,468 | Wood | Apr. 4, 1922 |
| 1,997,488 | Henry | Apr. 9, 1935 |